United States Patent
Hung

(10) Patent No.: US 10,791,237 B2
(45) Date of Patent: Sep. 29, 2020

(54) SCANNER

(71) Applicants: LITE-ON ELECTRONICS (GUANGZHOU) LIMITED, Guangzhou (CN); Lite-On Technology Corporation, Taipei (TW)

(72) Inventor: Chun-Tseng Hung, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/572,631

(22) Filed: Sep. 17, 2019

(65) Prior Publication Data

US 2020/0106912 A1    Apr. 2, 2020

(30) Foreign Application Priority Data

Sep. 27, 2018  (CN) .......................... 2018 1 1129871

(51) Int. Cl.
*H04N 1/04*   (2006.01)
*H04N 1/12*   (2006.01)
*H04N 1/00*   (2006.01)

(52) U.S. Cl.
CPC ......... *H04N 1/125* (2013.01); *H04N 1/00588* (2013.01); *H04N 1/00591* (2013.01); *H04N 1/00602* (2013.01); *H04N 1/00798* (2013.01); *H04N 2201/0432* (2013.01)

(58) Field of Classification Search
CPC ............... H04N 1/125; H04N 1/00588; H04N 1/00591; H04N 1/00602; H04N 1/00798; H04N 2201/0432

USPC ......... 358/461, 496, 498; 381/689, 696, 683
See application file for complete search history.

(56) References Cited

U.S. PATENT DOCUMENTS

| | | | |
|---|---|---|---|
| 8,998,208 B1* | 4/2015 | Hong | B65G 13/06 271/314 |
| 2008/0239416 A1* | 10/2008 | Kato | H04N 1/1215 358/498 |
| 2010/0085616 A1* | 4/2010 | Shinno | H04N 1/121 358/498 |
| 2011/0199653 A1* | 8/2011 | Nishikawa | H04N 1/203 358/483 |

(Continued)

FOREIGN PATENT DOCUMENTS

| | | |
|---|---|---|
| CN | 106464771 | 2/2017 |
| TW | M503039 | 6/2015 |
| TW | 201811649 | 4/2018 |

*Primary Examiner* — Cheukfan Lee
(74) *Attorney, Agent, or Firm* — JCIPRNET

(57) ABSTRACT

A scanner includes a paper feeding roller set, a paper exporting roller set, a scanning module, a background and calibration roller, a main driving assembly, a first sleeve, a torque limiter and a stop-driving assembly. The paper feeding roller set and the paper exporting roller set are driven by the main driving assembly. The background and calibration roller includes a black background section, a white background section and at least one calibration section. The first sleeve sleeves the first end and is linked to the main driving assembly. The torque limiter is disposed between the background and calibration roller and the first sleeve and contacts the same. The stop-driving assembly is selectively abutted against two portions of the background and calibration roller.

14 Claims, 19 Drawing Sheets

(56) References Cited

U.S. PATENT DOCUMENTS

| | | | | |
|---|---|---|---|---|
| 2012/0008997 A1* | 1/2012 | Takata | ................ | G03G 15/605 |
| | | | | 399/388 |
| 2014/0260739 A1* | 9/2014 | Hong | ................ | H04N 1/00602 |
| | | | | 74/354 |
| 2018/0109693 A1* | 4/2018 | Watanabe | .......... | H04N 1/00641 |

* cited by examiner

SCANNER

CROSS-REFERENCE TO RELATED APPLICATION

This application claims the priority benefit of Chinese patent application serial no. 201811129871.8, filed on Sep. 27, 2018. The entirety of the above-mentioned patent application is hereby incorporated by reference herein and made a part of this specification.

BACKGROUND

Technical Field

The invention relates to a scanner, and particularly relates to a scanner capable of providing a black background, a white background and a calibration section.

Description of Related Art

Generally, in order to improve a scanning effect, a background and calibration roller is generally configured at a position corresponding to a scanning module inside a scanner. The current background and calibration roller is configured with a single background section and a single calibration section on different parts of an outer surface thereof. The background section of the background and calibration roller is configured to increase scanning quality during a scanning process. The calibration section of the background and calibration roller is used for calibration of the scanning module before the scanning. The current scanner may adopt a rotation mechanism to rotate the background and calibration roller between two positions, so as to select the background section or the calibration section to face towards the scanning module.

However, the rotation mechanism of the conventional scanner can only rotate the background and calibration roller between two positions (the background section and the calibration section), so that only the single background section may be set. However, regarding the background section, a black background section and a white background section may provide different effects. If the numbers of the background sections or the calibration sections on the background and calibration roller are to be increased, the background and calibration roller is required to be positioned at different sections, which greatly increases difficulty of the mechanism.

SUMMARY

The invention is directed to a scanner provided with a background and calibration roller having a black background section, a white background section and at least one calibration section.

The invention provides a scanner including a paper feeding roller set, a paper exporting roller set, a scanning module, a background and calibration roller, a main driving assembly, a first sleeve, a torque limiter and a stop-driving assembly. The scanning module is disposed between the paper feeding roller set and the paper exporting roller set. The background and calibration roller is disposed side by side next to the scanning module, and the background and calibration roller has a first end and a second end opposite to each other, and includes a black background section, a white background section and at least one calibration section located between the first end and the second end. The main driving assembly includes a main power source and a transmission set linked to the main power source. The paper feeding roller set and the paper exporting roller set are linked to the transmission set. The first sleeve sleeves the first end of the background and calibration roller and is linked to the transmission set. The torque limiter is disposed between the first end of the background and calibration roller and the first sleeve and contacts the first end and the first sleeve, and a torque of the first sleeve is adapted to be transmitted to the background and calibration roller through the torque limiter. The stop-driving assembly is selectively abutting against two portions of the background and calibration roller, so as to make the black background section or the white background section of the background and calibration roller facing towards the scanning module.

Based on the above description of the invention, the main driving assembly of the scanner drives the background and calibration roller to rotate by means of the first sleeve and the torque limiter, and the third engaging portion of the stop-driving assembly is selectively engaged with the second sleeve, such as the first engaging portion, the second engaging portion or none of the above, so as to make the black background section of the background and calibration roller or the white background section of the background and calibration roller facing towards the scanning module, and therefore meets different requirements.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
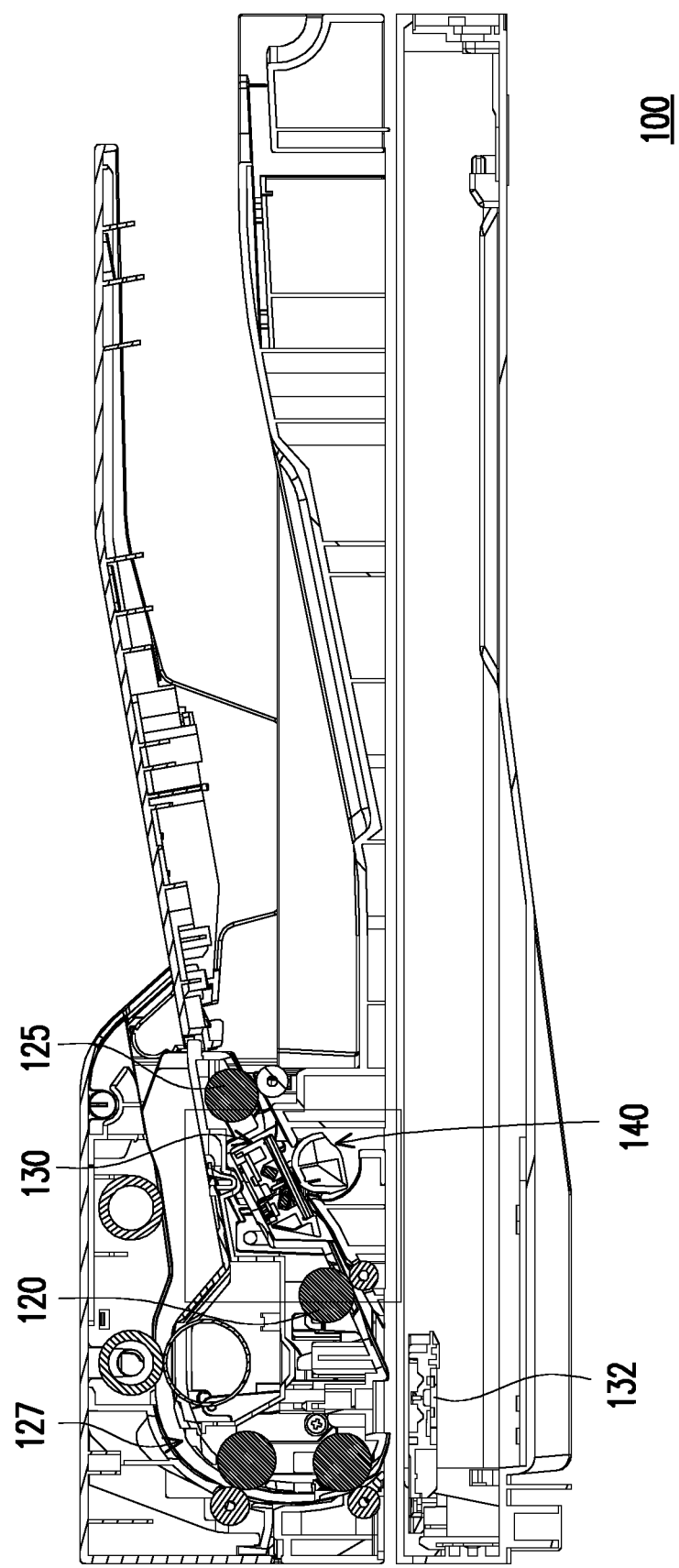
FIG. 1 is an internal side view of a scanner according to an embodiment of the invention.

FIG. 1 is an internal side view of a scanner according to an embodiment of the invention. Referring to FIG. 1, the scanner 100 of the embodiment is, for example, a Multi-Function Printer (MFP) with printing and scanning functions. Certainly, the type of the scanner 100 is not limited thereto. In FIG. 1, the scanner 100 has an upper portion and a lower portion. The lower portion of the scanner 100 includes a scanning module 132 (i.e., lower scanner module 132) capable of moving back and forth from the left to the right of FIG. 1 so as to provide the printing and scanning functions. The upper portion of the scanner 100 has a channel 127, and a plurality of rollers (including a paper feeding roller set 120 and a paper exporting roller set 125) is disposed beside the channel 127, and a paper (not shown) may be pushed by theses rollers to pass through the channel 127 to complete scanning. The upper portion of the scanner 100 includes a scanning module 130 (i.e., upper scanner module 130) and a background and calibration roller 140 located beside the upper scanning module 130.

In FIG. 1, when the paper passes through the lower scanning module 132, a lower surface of the paper may be scanned by the lower scanning module 132. Then, the paper passes through an interval between the upper scanning module 130 and the background and calibration roller 140, such that an upper surface of the paper is scanned by the scanning module 130. Namely, double-side scanning of the paper is completed during a process that the paper passes through the channel 127. In the embodiment, the background and calibration roller 140 of the scanner 100 may provide with a plurality of background sections and calibration sections, such that the upper scanning module 130 may have good scanning quality, which is described in detail below.

Figure 2:
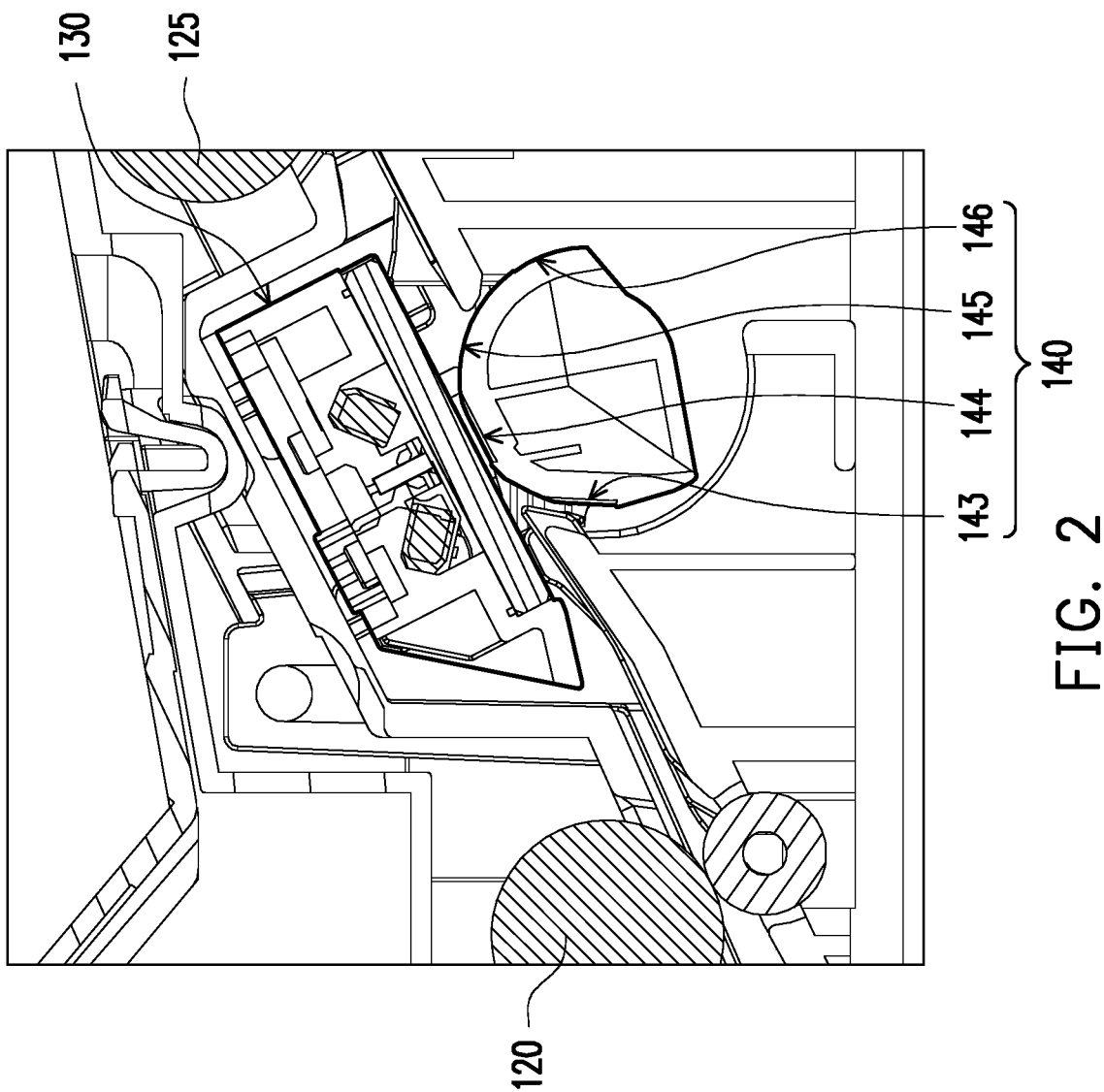
FIG. 2 is a partial enlarged view of FIG. 1.
Figure 3:
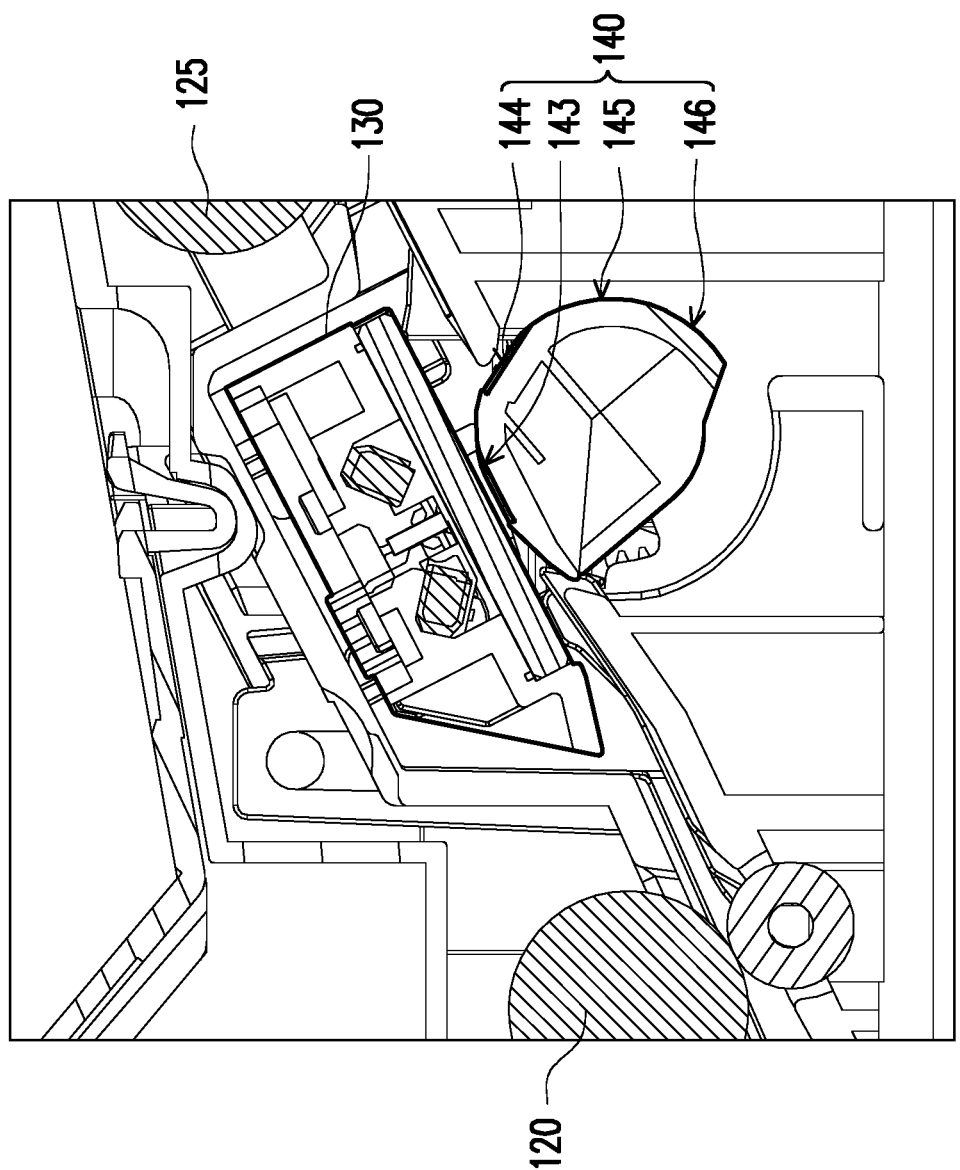
FIG. 3 is a partial enlarged view of a situation that a black background section of a background and calibration roller of FIG. 1 faces towards the scanning module.
Figure 4:
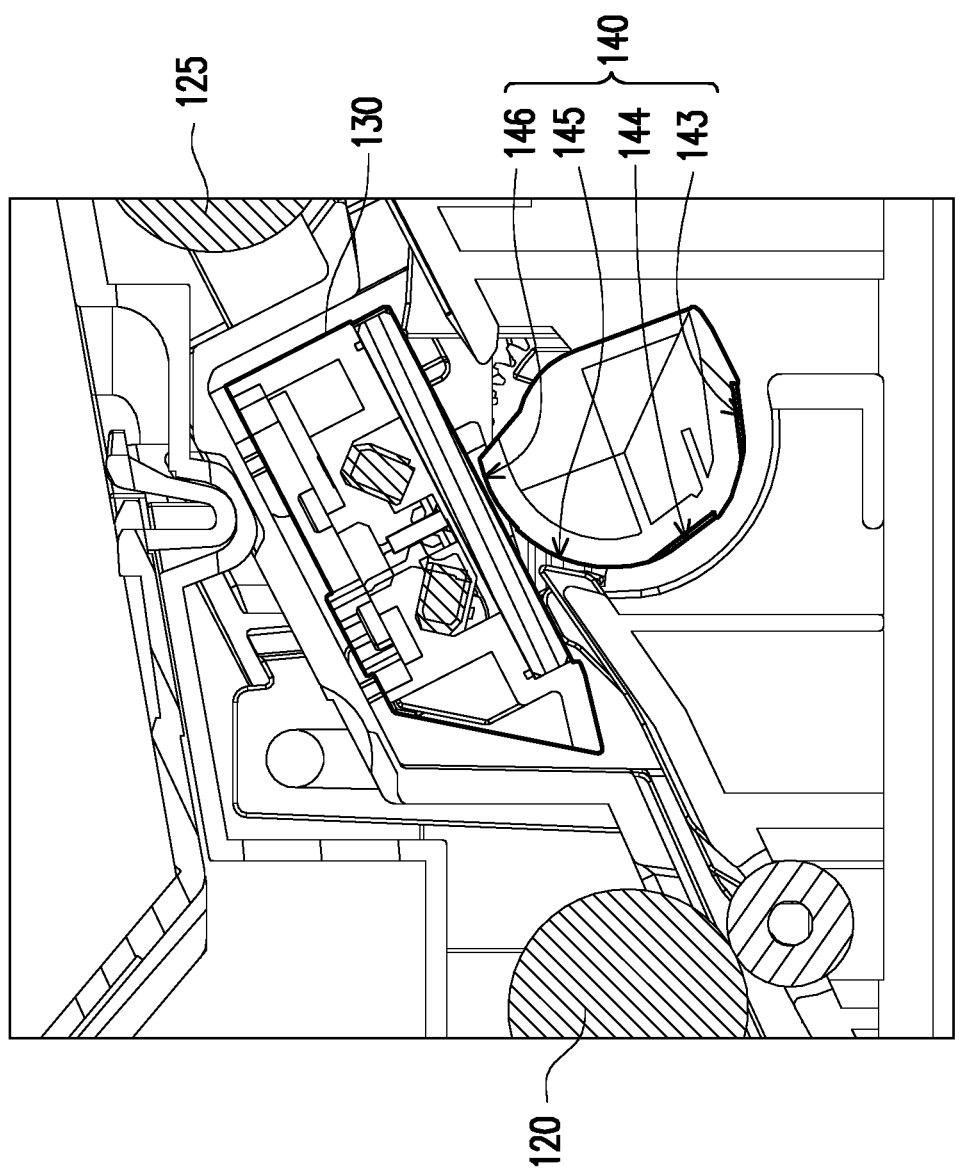
FIG. 4 is a partial enlarged view of a situation that a calibration section of the background and calibration roller of FIG. 1 faces towards the scanning module.

FIG. 2 is a partial enlarged view of FIG. 1. FIG. 3 is a partial enlarged view of a situation that a black background section of the background and calibration roller of FIG. 1 faces towards the scanning module. FIG. 4 is a partial enlarged view of a situation that a calibration section of the background and calibration roller of FIG. 1 faces towards the scanning module. Referring to FIG. 2 to FIG. 4, the background and calibration roller 140 of the scanner 100 includes a black background section 143, a white background section 144 and at least one calibration section, where locations of the black background section 143 and the white background section 144 may be exchanged. In the embodiment, the at least one calibration section includes a white calibration section 145 and a black calibration section 146, where locations of the white calibration section 145 and the black calibration section 146 may be exchanged. Namely, the background and calibration roller 140 of the embodiment includes four sections. The four sections are respectively located at different parts on an outer surface of the background and calibration roller 140. According to FIG. 2 to FIG. 4, it is known that the background and calibration roller 140 may be rotated relative to the scanning module 130 to make different sections to face towards the scanning module 130, so as to meet different requirements. In other embodiments, the at least calibration section may also only include one white calibration section 145 or one black calibration section 146.

In detail, when the scanned paper is relatively thin or is a penetrative film (for example, a slide or slides), the user may use a white background to fade an image on the back of the paper. In this case, as shown in FIG. 2, the background and calibration roller 140 is rotated and fixed to a position where the white background section 144 faces towards the scanning module 130. Moreover, the black background increases a boundary contrast when scanning a white paper. When the user needs to use the black background, as shown in FIG. 3, the background and calibration roller 140 is rotated and fixed to a position where the black background section 143 faces towards the scanning module 130. The white calibration section 145 and the black calibration section 146 may be provided to the scanning module 130 to calibrate a white color and a black color before scanning. When it is required to use the black calibration section 146, as shown in FIG. 4, the background and calibration roller 140 is rotated and fixed to a position where the black calibration section 146 faces towards the scanning module 130, and then the background and calibration roller 140 is rotated back to the black background section 143 or the white background section 144. Since the background and calibration roller 140 of the embodiment has the aforementioned four sections, the image output by the scanning module 130 may have better quality.

Figure 5:
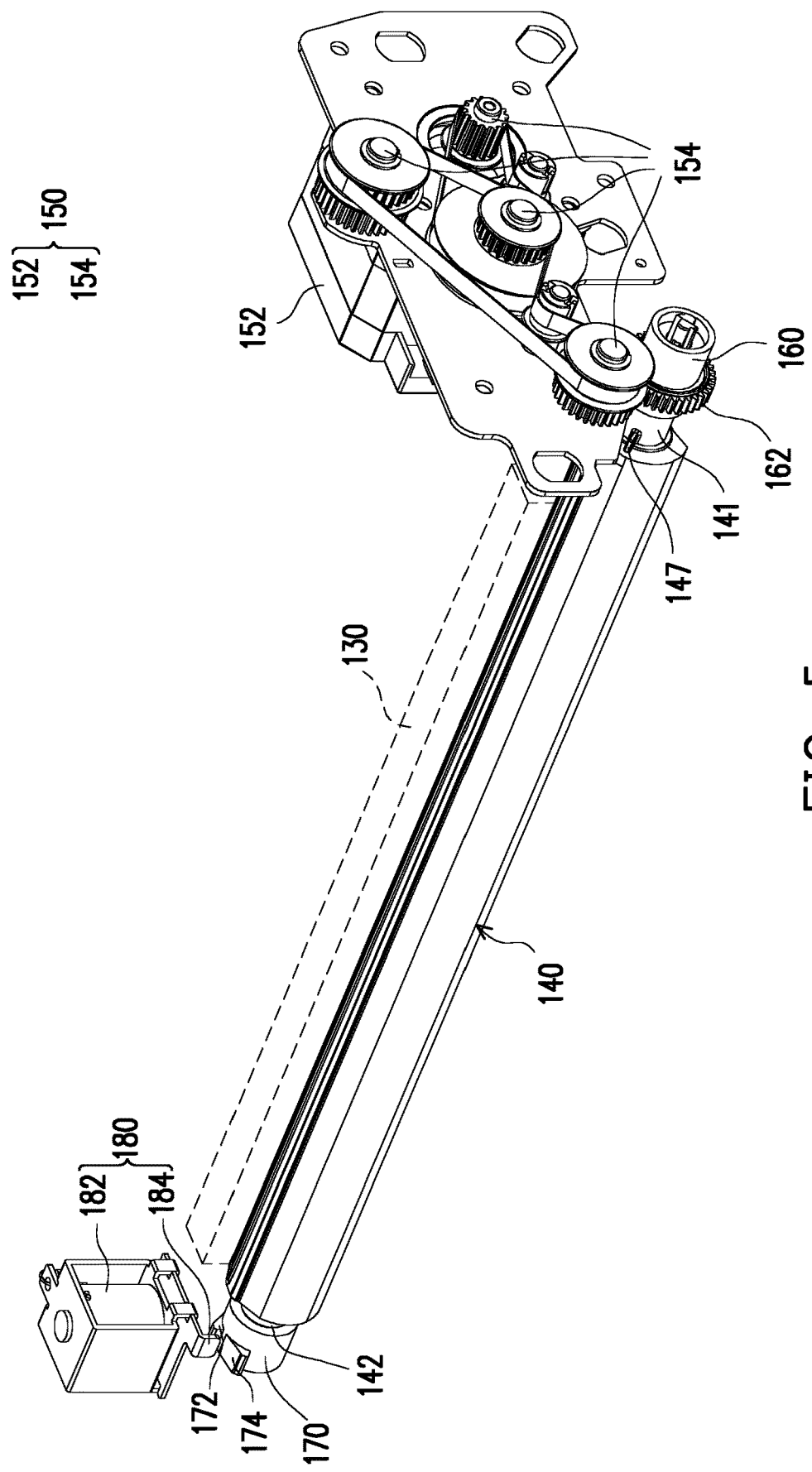
FIG. 5 is a schematic diagram of a part of components of the scanner of FIG. 1.
Figure 6:
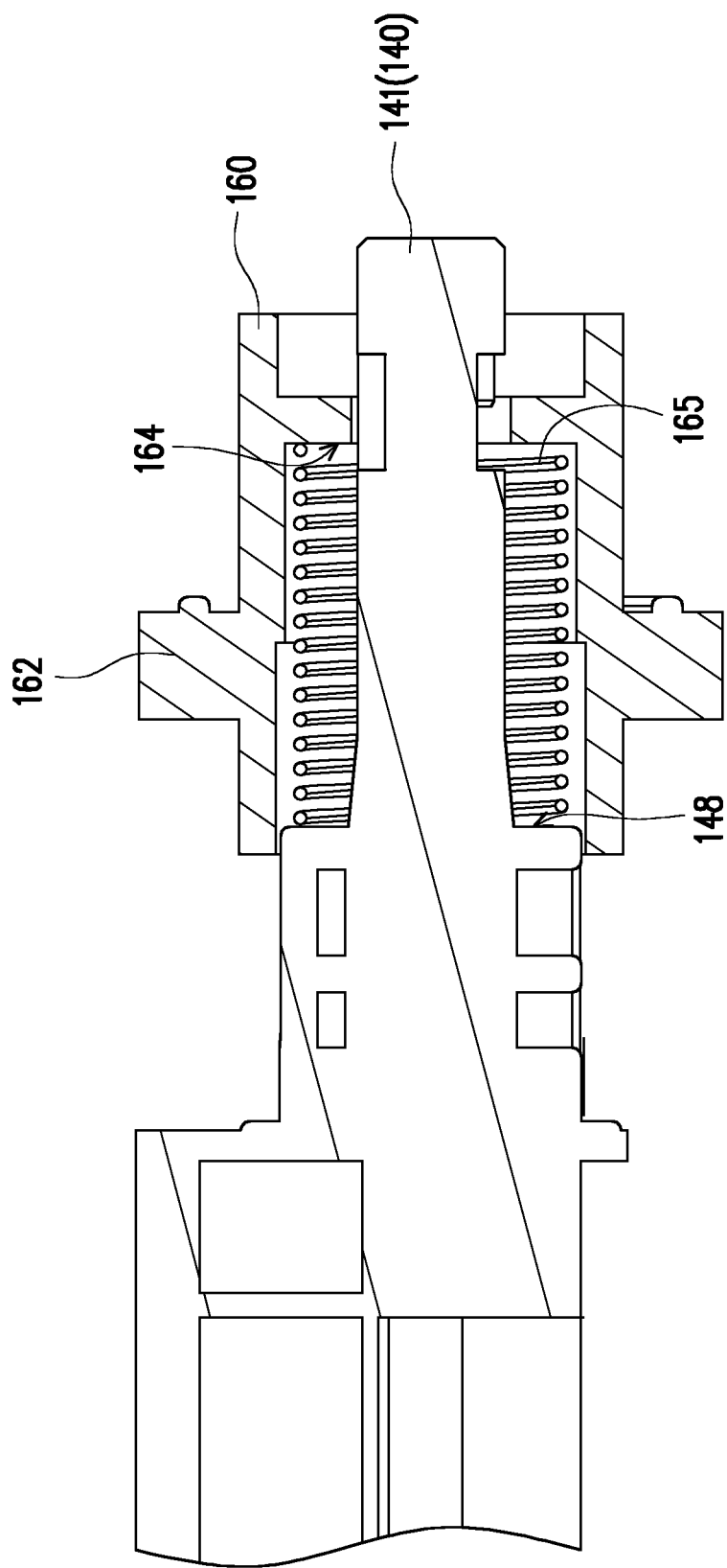
FIG. 6 is a partial cross-sectional view of a first sleeve, a torque limiter and a background and calibration roller of the scanner of FIG. 1.

How to rotate and position the background and calibration roller 140 is described below. FIG. 5 is a schematic diagram of a part of components of the scanner of FIG. 1. FIG. 6 is a partial cross-sectional view of a first sleeve, a torque limiter and a background and calibration roller of the scanner of FIG. 1. Referring to FIG. 5 and FIG. 6, the scanner 100 of the embodiment includes a main driving assembly 150, a first sleeve 160, a torque limiter 165 (FIG. 6), a second sleeve 170 and a stop-driving assembly 180.

In FIG. 5, the main driving assembly 150 includes a main power source 152 and a transmission set 154 linked to the main power source 152. In the embodiment, the main power source 152 is, for example, a motor, and the transmission set 154 is, for example, a combination of gears and pulleys, but the types of the main power source 152 and the transmission set 154 are not limited thereto. It should be noted that in the embodiment, the paper feeding roller set 120 (FIG. 1) and the paper exporting roller set 125 (FIG. 1) of the scanner 100 are linked to the transmission set 154. Namely, the main driving assembly 150 may be used for simultaneously driving the paper feeding roller set 120, the paper exporting roller set 125 and the background and calibration roller 140. In this way, the scanner 100 is unnecessary to configure an additional driving assembly to rotate the background and calibration roller 140, such that a volume of the mechanism and the number of the components are decreased accordingly. Certainly, the form of the main driving assembly 150 is not limited thereto.

The background and calibration roller 140 is disposed side by side next to the scanning module, and the background and calibration roller 140 has a first end 141 and a second end 142 opposite to each other. The first sleeve 160 sleeves the first end 141 of the background and calibration roller 140 and is linked to the transmission set 154. In the embodiment, the first sleeve 160 includes an external gear 162 meshed with a gear of the transmission set 154. Certainly, the first sleeve 160 may also be linked to the transmission set 154 through a belt, and the connection method is not limited by the invention.

As shown in FIG. 6, the torque limiter 165 is located between the first end 141 of the background and calibration roller 140 and the first sleeve 160 and contacts the first end 141 and the first sleeve 160. In detail, in the embodiment, the torque limiter 165 includes a spring, a first end of the spring contacts an inner surface 164 of the first sleeve 160, and another end of the spring contacts a surface 148 of the background and calibration roller 140 at the first end 141, such that a friction exists between the spring and the inner surface 164 of the first sleeve 160 and between the spring and the surface 148. In this way, a torque of the first sleeve 160 is adapted to be transmitted to the background and calibration roller 140 through the torque limiter 165. In other words, when the first sleeve 160 is rotated, the first sleeve 160 may drive the background and calibration roller 140 to rotate through the torque limiter 165. Certainly, in other embodiments, the torque limiter 165 may also be a leaf spring, and the type of the torque limiter 165 is not limited by the invention.

Referring back to FIG. 5, in the embodiment, the second sleeve 170 is fixed to the second end 142 of the background and calibration roller 140, and includes a first engaging portion 172 and a second engaging portion 174. The stop-driving assembly 180 is located beside the second sleeve 170 and includes a secondary power source 182 and a third engaging portion 184 linked to the secondary power source 182, and the stop-driving assembly 180 is a stop device used for controlling a stop position of the second sleeve 170. The secondary power source 182 is adapted to make the third engaging portion 184 to selectively engage or not engage with one of the first engaging portion 172 and the second engaging portion 174, so as to make the black background section 143, the white background section 144, the white calibration section 145 or the black calibration section 146 of the background and calibration roller 140 to face towards the scanning module 130. In the embodiment, the second sleeve 170 is, for example, a latch roller, but the type of the second sleeve 170 is not limited thereto.

Figure 7:
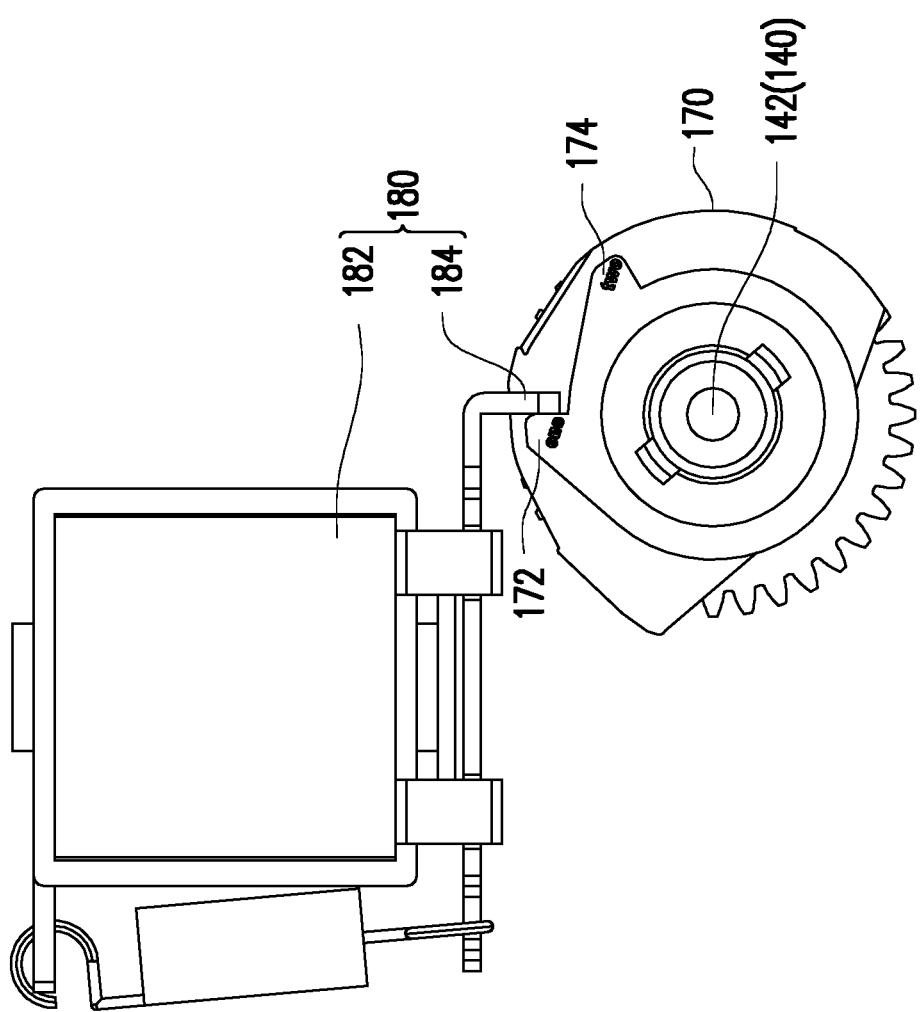
FIG. 7 to FIG. 9 are schematic diagrams of an engaging process of a stop-driving assembly and a second sleeve of the scanner of FIG. 1.
Figure 8:
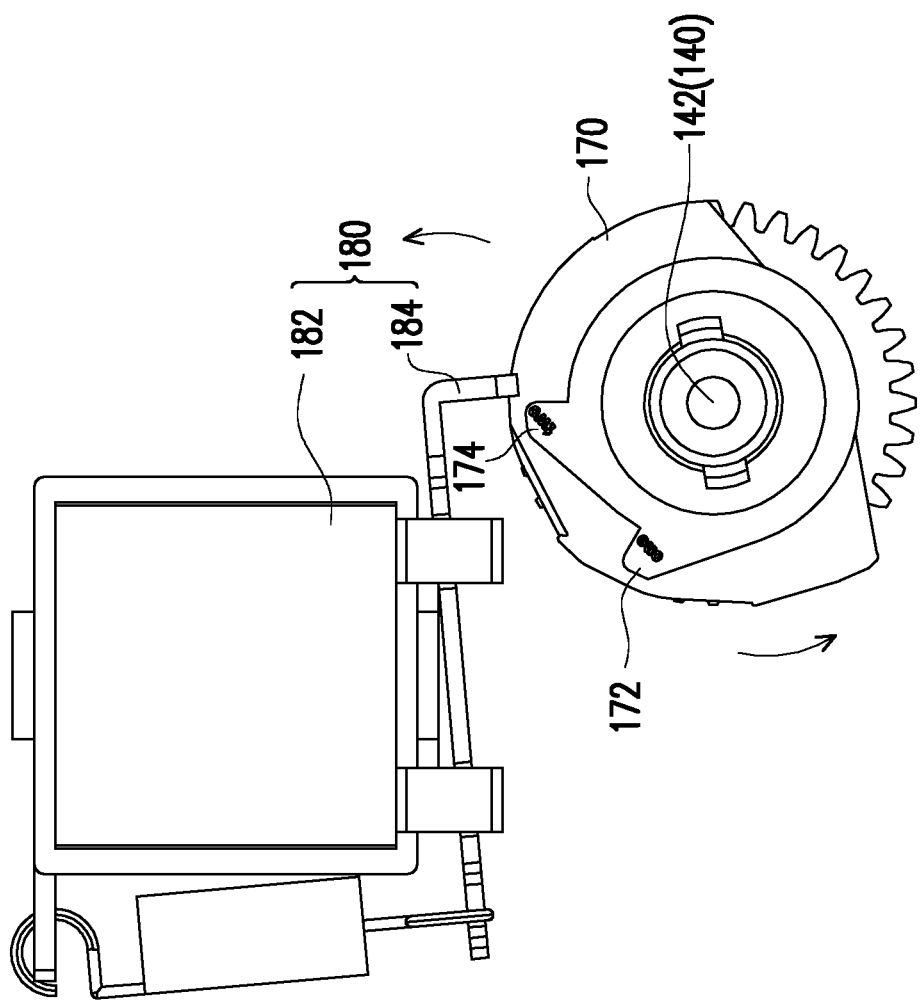
Figure 9:
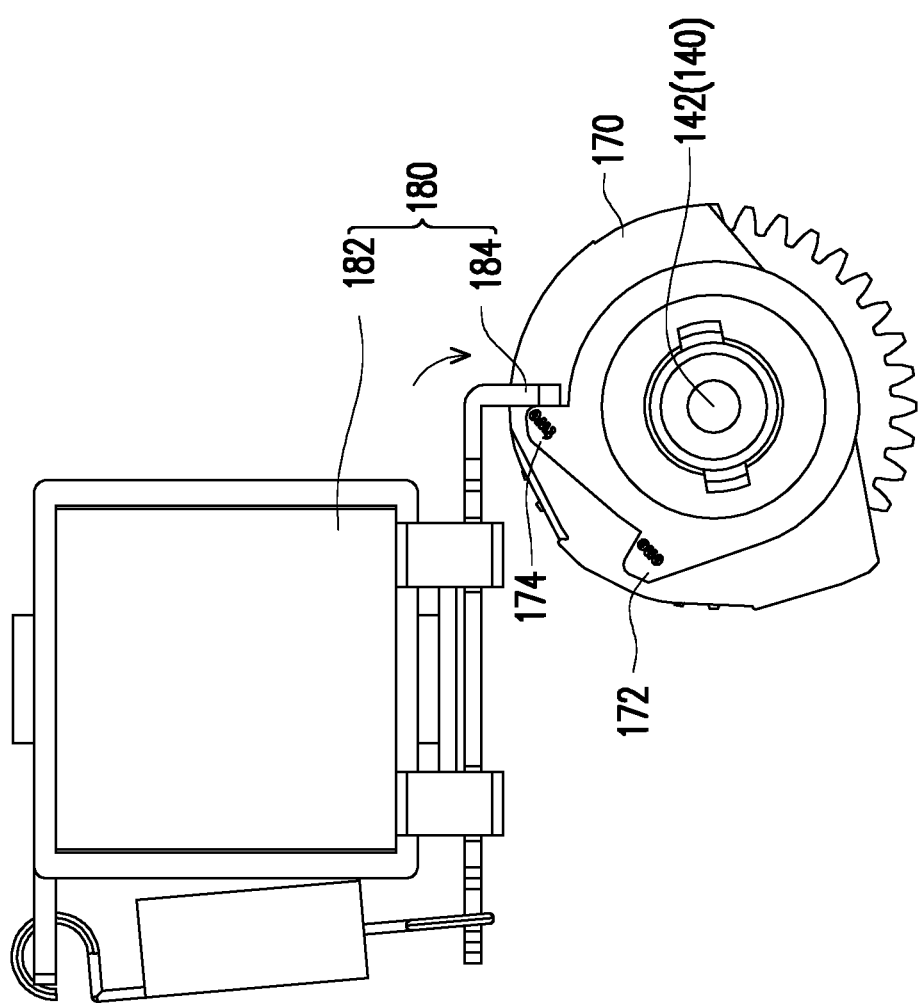

FIG. 7 to FIG. 9 are schematic diagrams of an engaging process of the stop-driving assembly and the second sleeve of the scanner of FIG. 1. Referring to FIG. 7, in the embodiment, the secondary power source 182 is, for example, an electromagnetic valve, the third engaging portion 184 is, for example, a magnetic member. The third engaging portion 184 of the stop-driving member 180 is adapted to be engaged to the first engaging portion 172 of the second sleeve 170. In case of paper feeding or exporting, the main driving assembly 150 operates to sequentially drive the first sleeve 160, the background and calibration roller 140 and the second sleeve 170, and the third engaging portion 184 of the stop-driving assembly 180 may be engaged to the first engaging portion 172 of the second sleeve 170, such that the black background section 143 of the background and calibration roller 140 faces towards the scanning module 130.

When other section is selected to face towards the scanning module 130, the secondary power source 182 is activated to attract the third engaging portion 184, as shown in FIG. 8, and the third engaging portion 184 is moved upwards to release a fixing relationship with the first engaging portion 172. At this moment, since the background and calibration roller 140 and the second sleeve 170 are not limited, the second engaging portion 174 of the second sleeve 170 driven by the main driving assembly 150 may be rotated to a position corresponding to the third engaging portion 184.

As shown in FIG. 9, the secondary power source 182 may stop operating, and the third engaging portion 184 is not magnetically attracted and restored to an original position, and is engaged to the second engaging portion 174. In the embodiment, when the third engaging portion 184 of the stop-driving member 180 is engaged to the second engaging portion 174 of the second sleeve 170, the white background section of the background and calibration roller 140, for example, faces towards the scanning module 130.

In the embodiment, since the main driving assembly 150 is used for driving the paper feeding roller set 120 and the paper exporting roller set 125, the main driving assembly 150 continuously operates, but the background and calibration roller 140 is required to be rotated to a specific position for fixing. In the embodiment, the torque limiter 165 is specifically configured between the first sleeve 160 and the background and calibration roller 140, and the third engaging portion 184 is selectively engaged with the first engaging portion 172 or the second engaging portion 174, such that the background and calibration roller 140 may be rotated to a specific position for fixing.

To be specific, when the third engaging portion 184 of the stop-driving assembly 180 is still not engaged with one of the first engaging portion 172 and the second engaging portion 174 of the second sleeve, the background and calibration roller 140 is not limited, and the main driving assembly 150 operates to sequentially drive the first sleeve 160, the torque limiter 165 and the background and calibration roller 140 to rotate.

When the background and calibration roller 140 is rotated to the specific position and is to be fixed, the third engaging portion 184 of the stop-driving assembly 180 is engaged with one of the first engaging portion 172 and the second engaging portion 174 of the second sleeve 170, such that the background and calibration roller 140 is accordingly fixed. At this moment, although the operation of the main driving assembly 150 may drive the first sleeve, but since the background and calibration roller 140 is fixed, the friction between the torque limiter 165 and the surface 148 of the background and calibration roller 140 is not enough to drive the background and calibration roller 140 to rotate, the first sleeve presents an idle state. Namely, when the main driving assembly 150 operates, the first sleeve 160 is rotated, but the background and calibration roller 140 does not follow the rotation and stays at a specific position. In this way, the black background section 143 or the white background section 144 of the background and calibration roller 140 may face towards the scanning module 130.

Moreover, when the scanner 100 performs black calibration or white calibration, since an area of the black calibration section or the white calibration section of the background and calibration roller 140 is relatively large, the two sections may face towards the scanning module 130 and rotate, so that the main driving assembly 150 is only required to rotate the black calibration section 146 or the white calibration section 145 of the background and calibration roller 140 to face towards the scanning module 130 without fixing the background and calibration roller 140. In other words, the third engaging portion 184 is not engaged with the first engaging portion 172 or the second engaging portion 174.

It should be noted that since the second sleeve 170 and the background and calibration roller 140 are driven synchronously, in other embodiments, the second sleeve 170 and the background and calibration roller 140 may also be formed integrally, i.e. the background and calibration roller 140 has the mechanical characteristics of the blocked function of the second sleeve 170.

In the embodiment, since the scanner 100 adopts the main driving assembly 150 originally used for driving the paper feeding roller set 120 and the paper exporting roller set 125 to serve as the driving assembly for driving the background and calibration roller 140, the scanner 100 is unnecessary to additionally configure a driving assembly for driving the background and calibration roller 140. Compared to the conventional scanner, the scanner 100 of the embodiment is only required to add a set of stop-driving assembly 180 to selectively fix the second sleeve 170, and the background and calibration roller 140 may be positioned to a plurality of positions, such that the background and calibration roller 140 may have the black background section or the white background section to provide the scanner 100 with better scanning quality. Certainly, the type of the stop-driving assembly 180 is not limited thereto.

Figure 10:
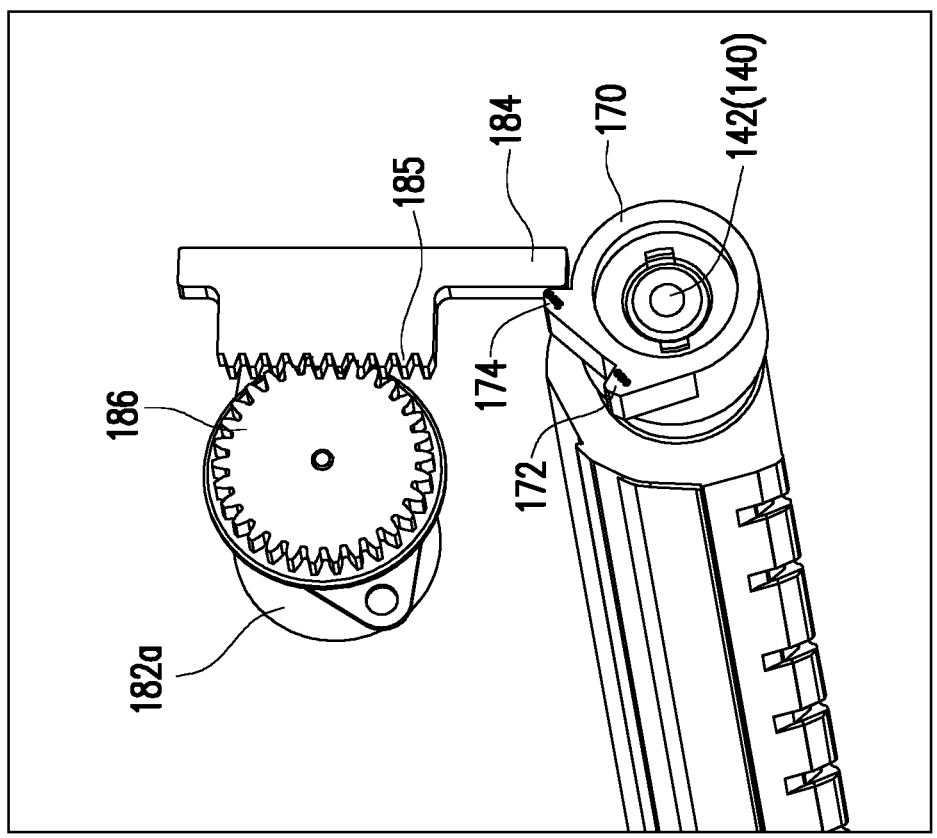
FIG. 10 is a schematic diagram of a stop-driving assembly of a scanner according to another embodiment of the invention.

FIG. 10 is a schematic diagram of a stop-driving assembly of a scanner according to another embodiment of the invention. Referring to FIG. 10, in the embodiment, the secondary power source 182*a* includes a motor, the stop-driving assembly 180*a* further includes a gear 186 connected to the motor, and the third engaging portion 184 includes a gear rack 185 meshed with the gear 186. In the embodiment, the motor may drive the gear 186 to rotate, so as to drive the gear rack 185 to move up and down, so that the third engaging portion 184 may be engaged or not engaged with the first engaging portion 172 or the second engaging portion 174.

Figure 11:
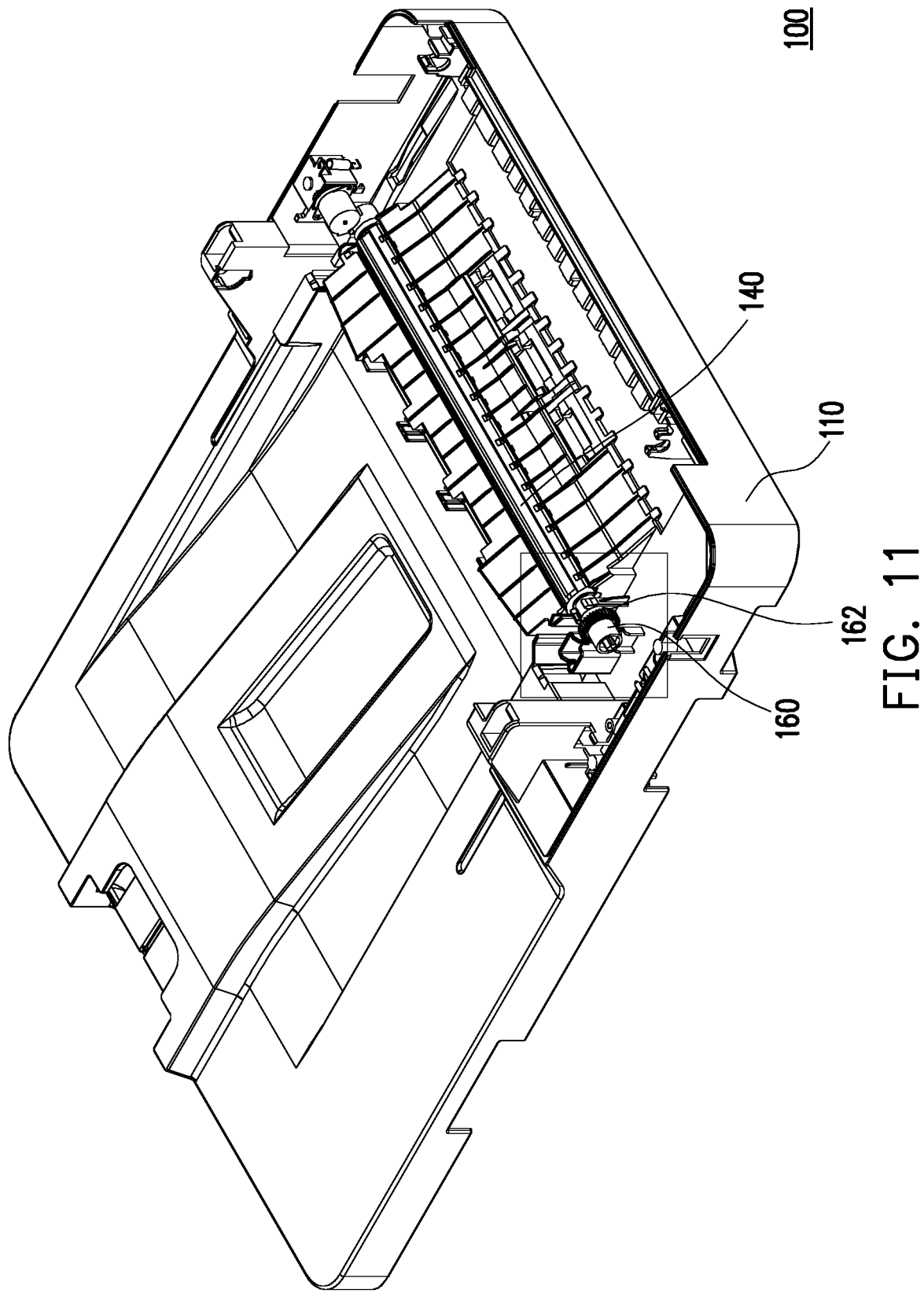
FIG. 11 is a schematic diagram of a background and calibration roller and a casing of the scanner of FIG. 1.
Figure 12:
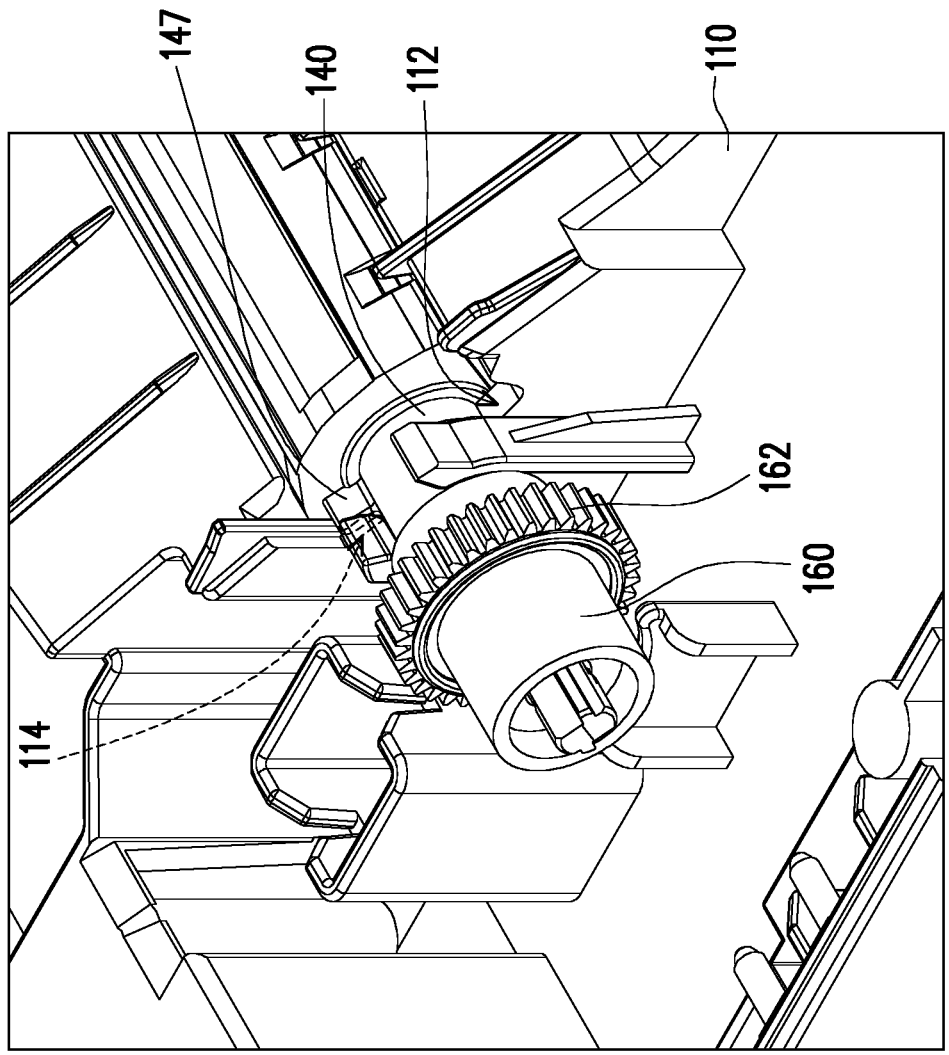
FIG. 12 is a partial enlarged view of FIG. 11.

FIG. 11 is a schematic diagram of a background and calibration roller and a casing of the scanner of FIG. 1. FIG. 12 is a partial enlarged view of FIG. 11. Referring to FIG. 11 and FIG. 12, in the embodiment, the scanner 100 further includes a casing 110, and the background and calibration roller 140 is rotatably disposed in the casing 110. As shown in FIG. 12, the background and calibration roller 140 includes a stop block 147, and the casing 110 includes a first stop wall 112 and a second stop wall 114 located on a rotating path of the stop block 147. The first stop wall 112 and the second stop wall 114 are used for defining a rotating range of the background and calibration roller 140 to avoid excessive rotation of the background and calibration roller 140. A rotating range of the stop block 147 between the first stop wall 112 and the second stop wall 114 is, for example, the rotating range of the background and calibration roller 140 shown in FIG. 3 to FIG. 4.

To be specific, in the embodiment, when the scanner 100 performs a black calibration procedure or a white calibration procedure, it is only required to rotate the black calibration section 146 or the white calibration section 145 of the background and calibration roller 140 to face towards the scanning module 130, the scanning module 130 may then start the calibration. In the black calibration procedure or the white calibration procedure, the scanning module 130 may radially scan the black calibration section 146 or the white calibration section 145. Regarding the black calibration procedure, the black calibration section 146 of the background and calibration roller 140 may be first turned to the scanning module 130 from a boundary of the black calibration section 146 and the white calibration section 145. Then, the background and calibration roller 140 is rotated while the scanning module 130 performs scanning until the stop block 147 is stopped by the second stop wall 114.

Figure 13:
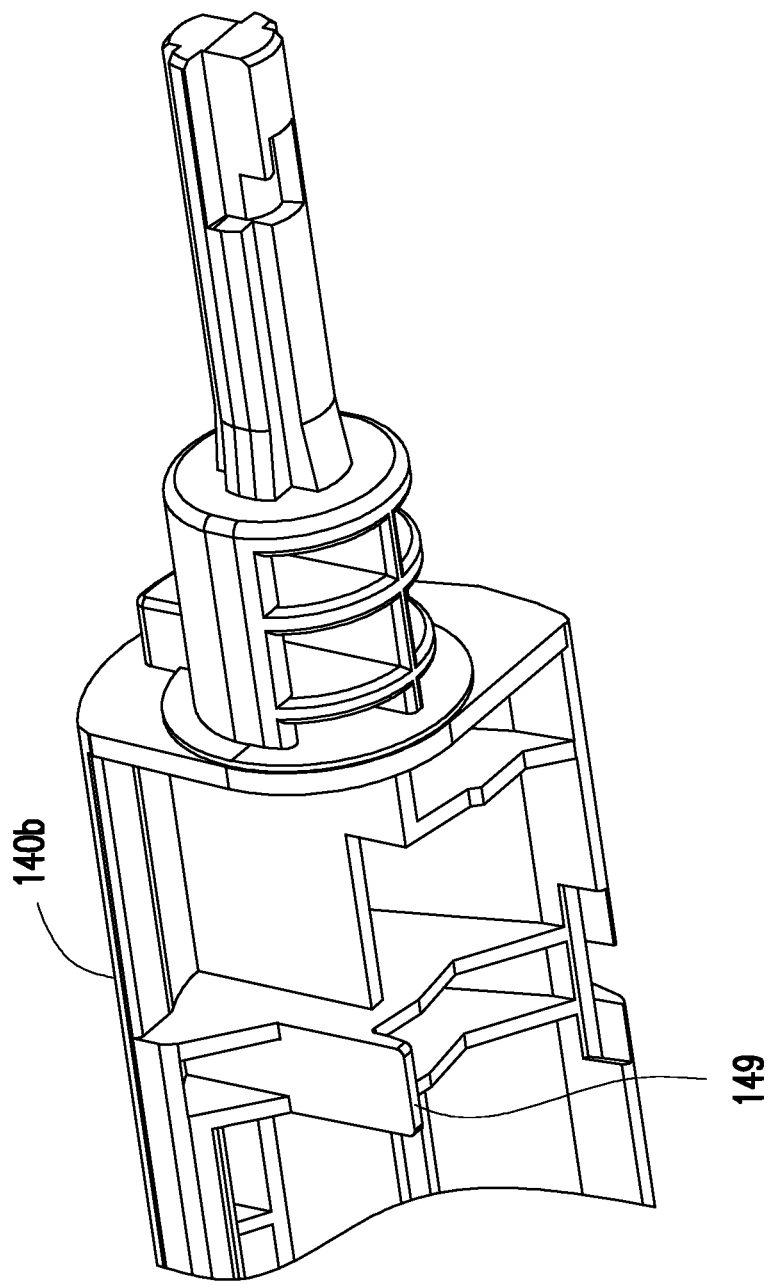
FIG. 13 is a partial schematic diagram of a background and calibration roller according to another embodiment of the invention.

FIG. 13 is a partial schematic diagram of a background and calibration roller according to another embodiment of the invention. Referring to FIG. 13, a main difference between the background and calibration roller 140 of FIG. 5 and the background and calibration roller 140*b* is that, in FIG. 5, the second sleeve 170 is fixed to the second end 142 of the background and calibration roller 140, and includes the first engaging portion 172 and the second engaging portion 174 for being fixed to different positions. In FIG. 13, the background and calibration roller 140*b* includes a positioning member 149 for being fixed to different positions such that the second sleeve 170 in FIG. 5 can be omitted. In the embodiment, the positioning member 149 is integrated with the background and calibration roller 140*b*. Certainly, in another embodiment, the positioning member 149 can be manufactured first and then be fixed to the background and calibration roller 140*b*. In addition, the positioning method of the background and calibration roller 140*b* is not limited thereto.

Figure 14A:
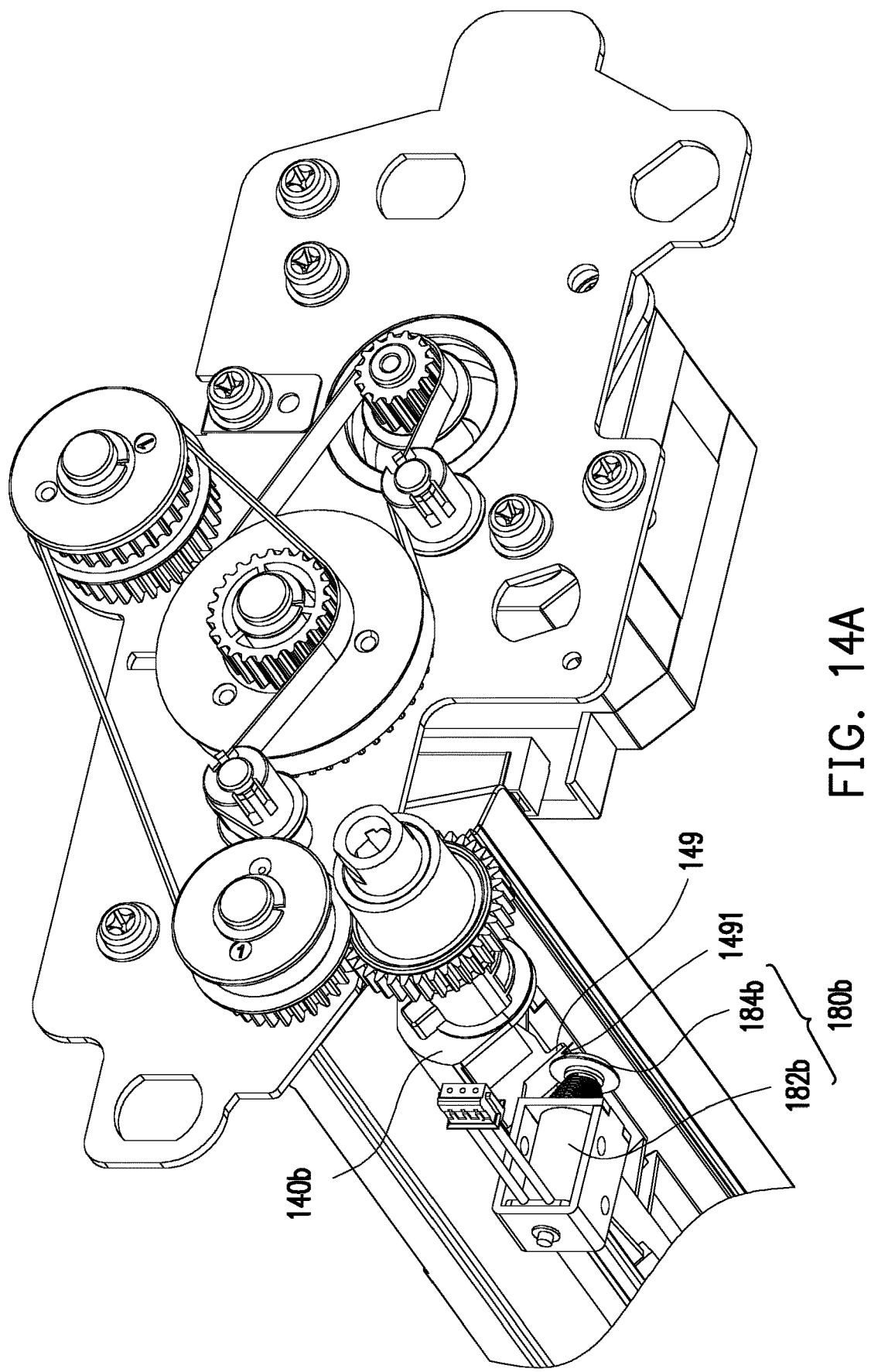
FIG. 14A is a partial schematic diagram of the stop-driving assembly abutted against a surface of a positioning member of the background and calibration roller of FIG. 13.
Figure 14B:
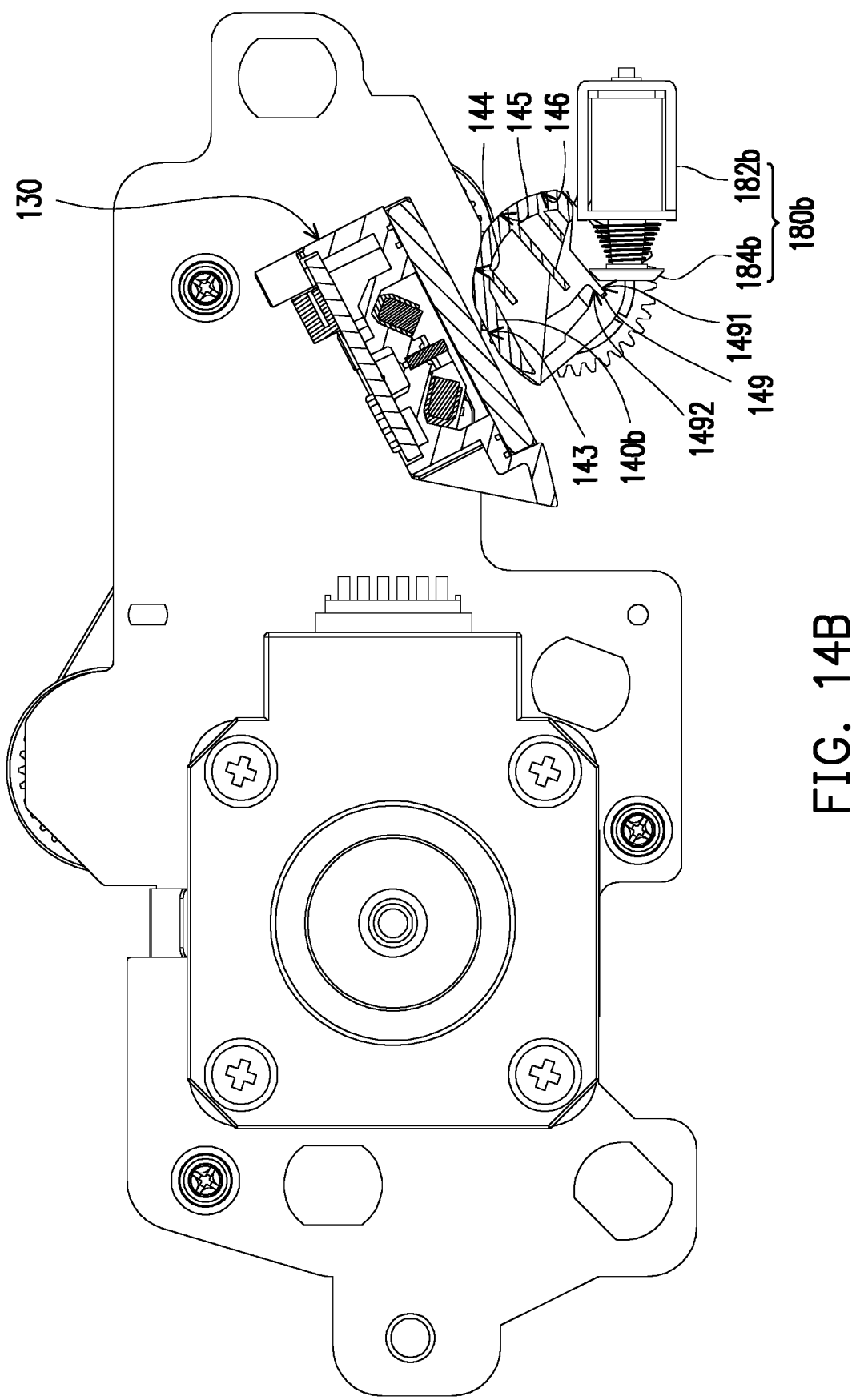
FIG. 14B is a partial enlarged view of a situation that a black background section of the background and calibration roller of FIG. 13 faces towards the scanning module.

FIG. 14A is a partial schematic diagram of the stop-driving assembly abutted against a surface of a positioning member of the background and calibration roller of FIG. 13. FIG. 14B is a partial enlarged view of a situation that a black background section of the background and calibration roller of FIG. 13 faces towards the scanning module. Referring to FIG. 14A and FIG. 14B, in the embodiment, the stop-driving assembly 180*b* is located beside the positioning member 149 of the background and calibration roller 140*b* and includes a secondary power source 182*b* (e.g. an electromagnetic valve) and a third engaging portion 184*b* linked to the secondary power source 182*b*, and the stop-driving assembly 180*b* is a stop device used for controlling a stop position of the background and calibration roller 140*b*. The secondary power source 182*b* is adapted to make the third engaging portion 184*b* to move by magnetization so as to selectively abutted against a first surface 1491 (e.g. an inclined surface) or a second surface 1492 of the positioning member 149, so as to make the black background section 143, the white background section 144, the white calibration section 145 or the black calibration section 146 of the background and calibration roller 140*b* to face towards the scanning module 130.

As shown in FIG. 14B, when the third engaging portion 184*b* is abutted against the first surface 1491 of the positioning member 149, the background and calibration roller 140*b* does not rotate, the black background section 143 of the background and calibration roller 140*b* faces towards the scanning module 130.

Figure 15A:
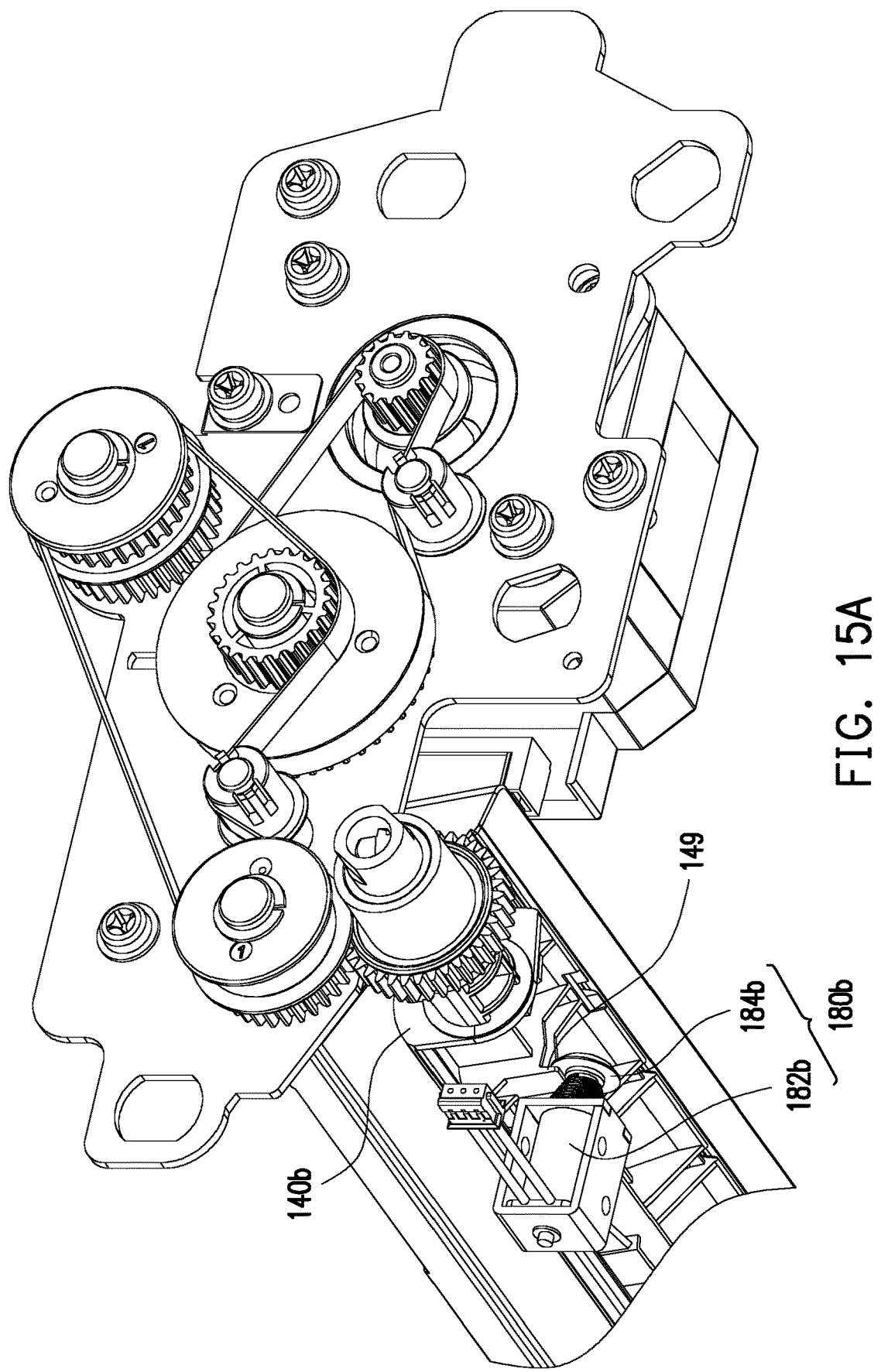
FIG. 15A is a partial schematic diagram of the stop-driving assembly engaged with the positioning member of the background and calibration roller of FIG. 13.
Figure 15B:
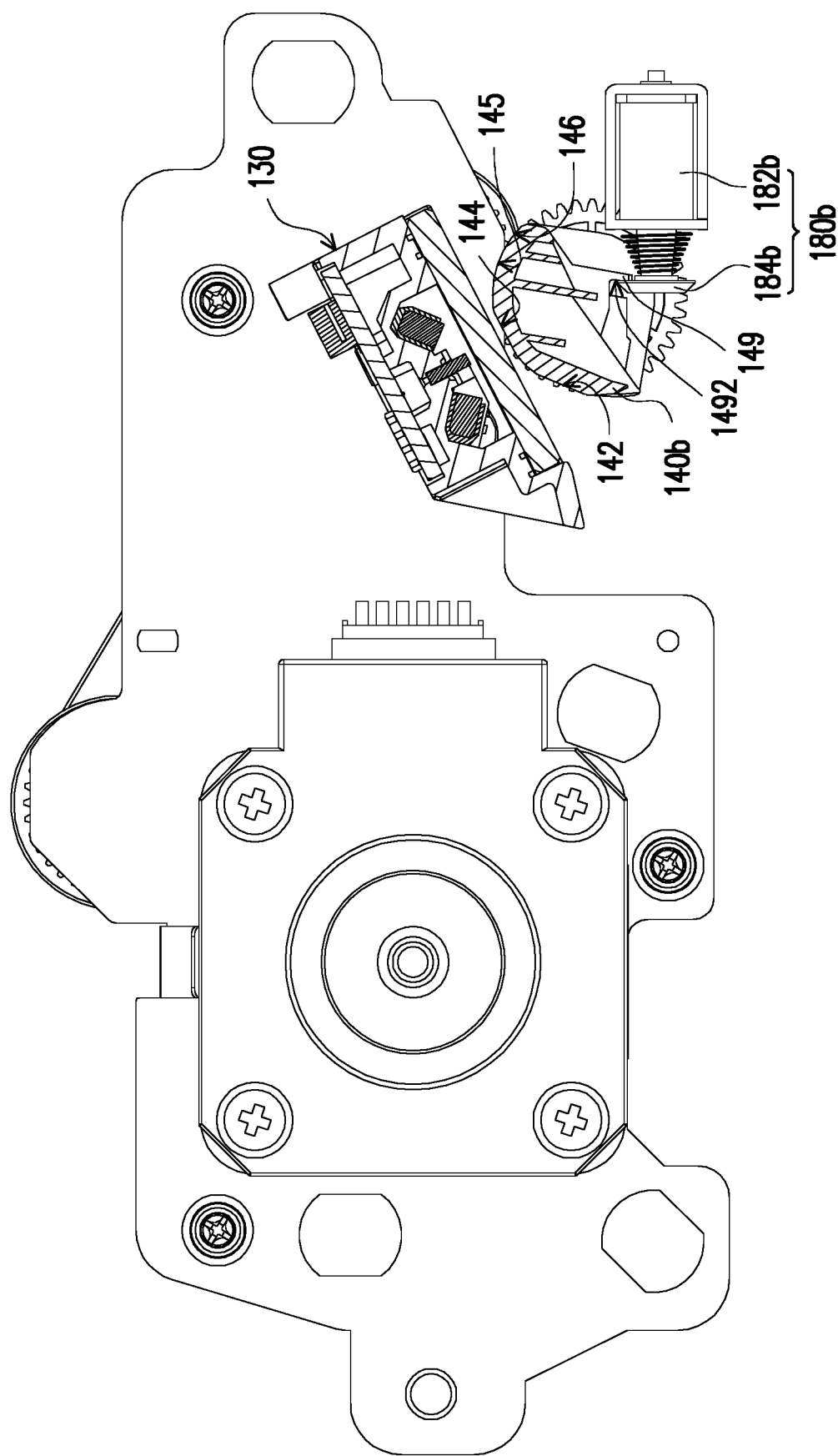
FIG. 15B is a partial enlarged view of a situation that a white background section of the background and calibration roller of FIG. 13 faces towards the scanning module.

FIG. 15A is a partial schematic diagram of the stop-driving assembly engaged with the positioning member of the background and calibration roller of FIG. 13. FIG. 15B is a partial enlarged view of a situation that a white background section of the background and calibration roller of FIG. 13 faces towards the scanning module. Referring to FIG. 15A and FIG. 15B, due to the cooperation between rotation of the background and calibration roller 140*b* and movement of the third engaging portion 184*b*, the third engaging portion 184*b* is moved to abutted against the second surface 1492 of the positioning member 149. At this time, the background and calibration roller 140*b* does not rotate, the white calibration section 145 of the background and calibration roller 140*b* faces towards the scanning module 130.

Figure 16A:
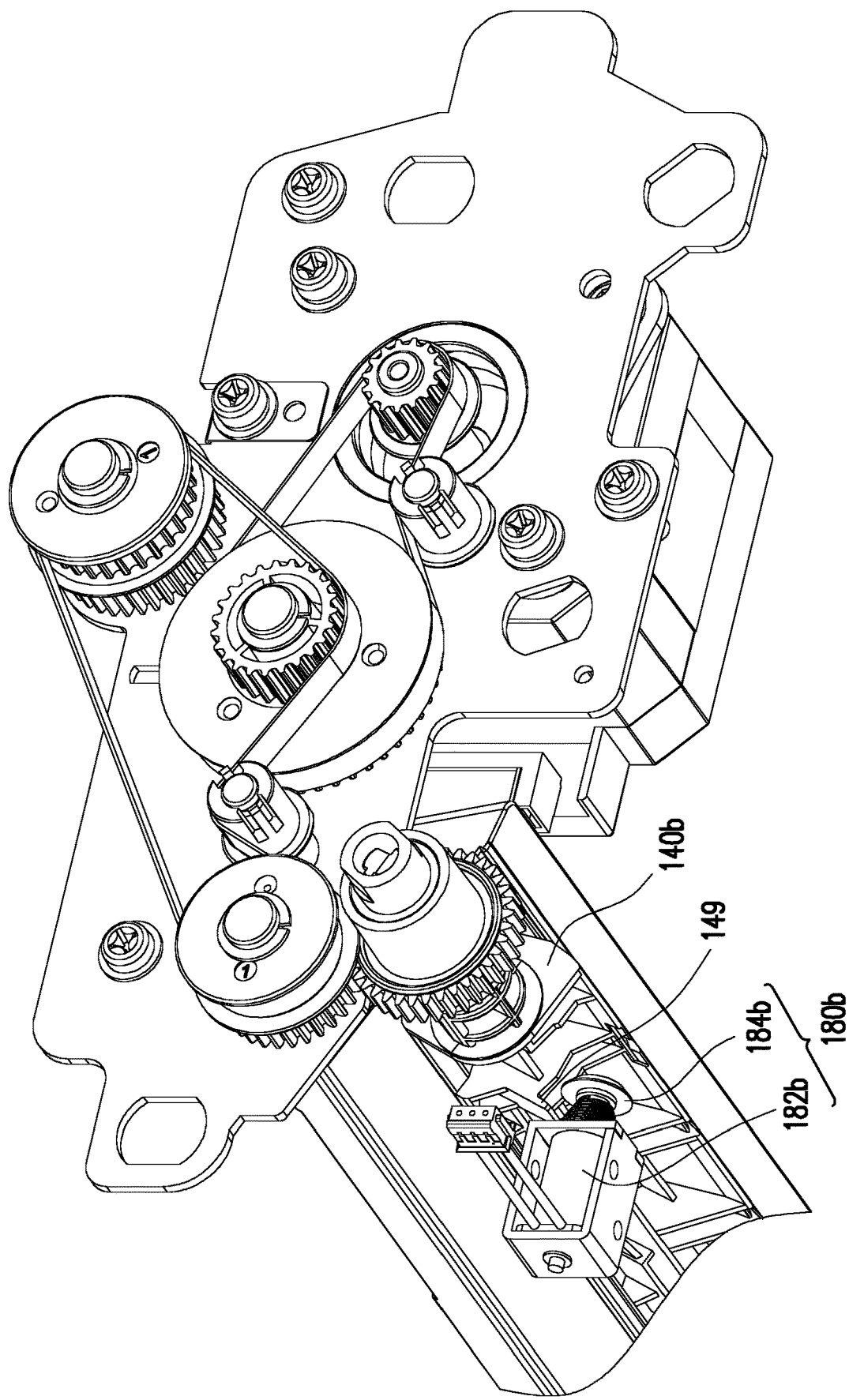
FIG. 16A is a partial schematic diagram of the stop-driving assembly not abutted against or engaged with the positioning member of the background and calibration roller of FIG. 13.
Figure 16B:
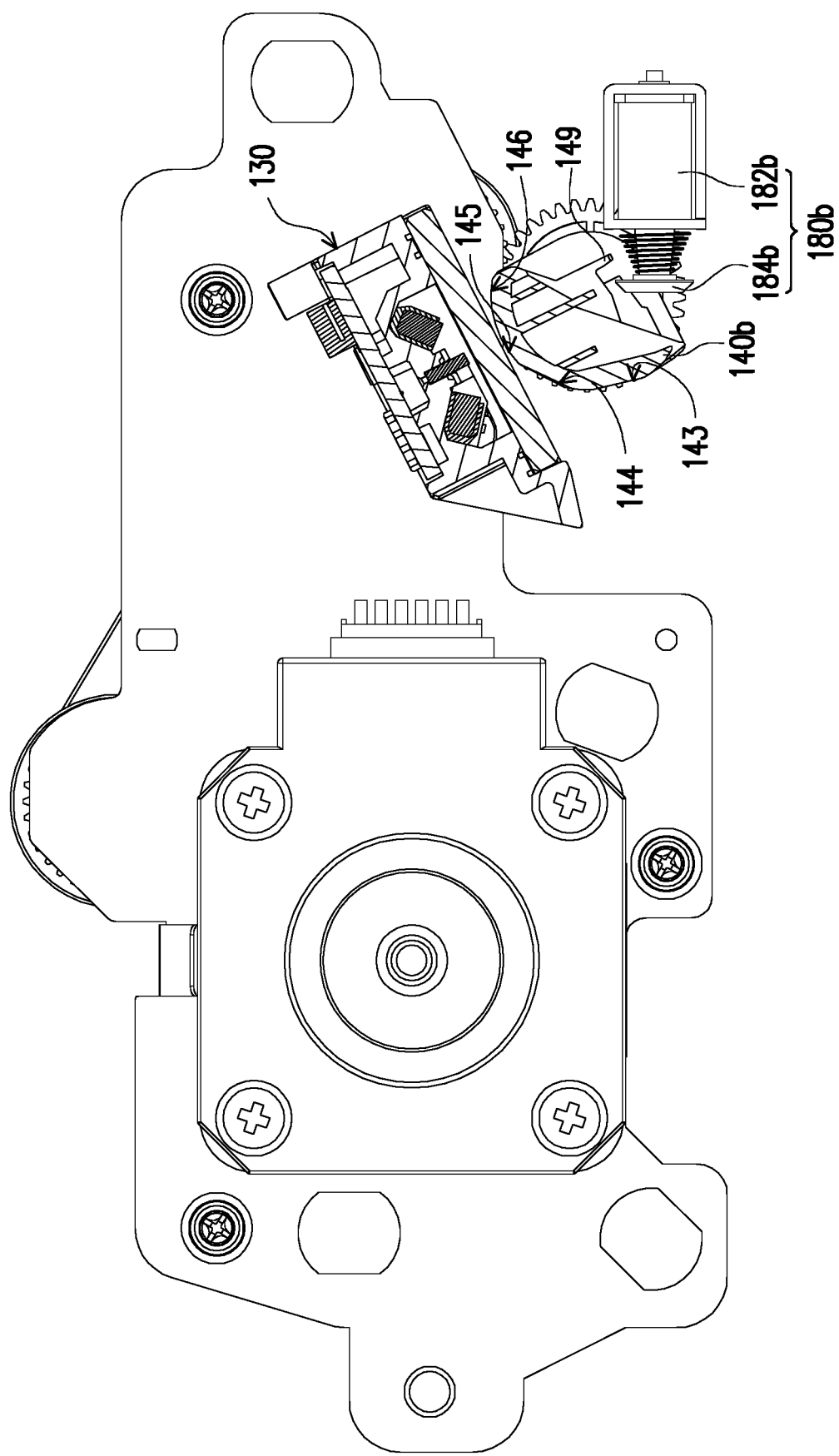
FIG. 16B is a partial enlarged view of a situation that a calibration section of the background and calibration roller of FIG. 13 faces towards the scanning module.

FIG. 16A is a partial schematic diagram of the stop-driving assembly not abutted against or engaged with the positioning member of the background and calibration roller of FIG. 13. FIG. 16B is a partial enlarged view of a situation that a calibration section of the background and calibration roller of FIG. 13 faces towards the scanning module. Referring to FIG. 16A and FIG. 16B, when one of the white calibration section 145 and the black calibration section 146 of the background and calibration roller 140b faces towards the scanning module 130, the third engaging portion 184b is not abutted against the first surface 1491 and the second surface 1492 of the positioning member 149. In the white calibration procedure or the black calibration procedure, the scanning module 130 may radially scan the white calibration section 145 or the black calibration section 146.

More specifically, in the embodiment, the white calibration section 145 of the background and calibration roller 140b faces towards the scanning module 130. Regarding the white calibration procedure, the white calibration section 145 of the background and calibration roller 140 may be first turned to the scanning module 130 from a boundary of the white background section 144 and the white calibration section 145. Then, the background and calibration roller 140 is rotated while the scanning module 130 performs scanning.

In summary, the scanner of the invention uses the main driving assembly, the first sleeve and the torque limiter to drive the background and calibration roller to rotate, and the third engaging portion of the stop-driving assembly is selectively engaged or not engaged with the first engaging portion or the second engaging portion, so as to make the black background section or the white background section of the background and calibration roller facing towards the scanning module, and meet different requirements. In an embodiment, the main driving assembly may be the driving assembly originally driving the paper feeding roller set and the paper exporting roller set, and the scanner is unnecessary to additionally configure a driving assembly for driving the background and calibration roller, so as to simplify the mechanism.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A scanner, comprising:
a paper feeding roller set;
a paper exporting roller set;
a scanning module, disposed between the paper feeding roller set and the paper exporting roller set;
a background and calibration roller, disposed side by side next to the scanning module, and the background and calibration roller having a first end and a second end opposite to each other, and comprising a black background section, a white background section and at least one calibration section located between the first end and the second end;
a main driving assembly, comprising a main power source and a transmission set linked to the main power source, wherein the paper feeding roller set and the paper exporting roller set are linked to the transmission set;
a first sleeve, sleeving the first end of the background and calibration roller, and linked to the transmission set;
a torque limiter, disposed between the first end of the background and calibration roller and the first sleeve and contacting the first end and the first sleeve, wherein a torque of the first sleeve is adapted to be transmitted to the background and calibration roller through the torque limiter; and
a stop-driving assembly, selectively abutting against two portions of the background and calibration roller, so as to make the black background section or the white background section of the background and calibration roller facing towards the scanning module.

2. The scanner as claimed in claim 1, further comprising:
a second sleeve, fixed to the second end of the background and calibration roller, and the two portions of the background and calibration roller comprising a first engaging portion and a second engaging portion respectively, wherein the stop-driving assembly is located beside the second sleeve and comprises a third engaging portion, the third engaging portion is selectively engaged with the first engaging portion or the second engaging portion, so as to make the black background section or the white background section of the background and calibration roller facing towards the scanning module.

3. The scanner as claimed in claim 2, wherein the stop-driving assembly comprises a secondary power source, the third engaging portion is linked to the secondary power source, and the secondary power source is adapted to make the third engaging portion to selectively engage with the first engaging portion or the second engaging portion, and when the third engaging portion is not engaged with the first engaging portion or the second engaging portion, the first sleeve is driven by the main driving assembly to rotate and drive the torque limiter, and the torque limiter drives the background and calibration roller to rotate, and when the third engaging portion is engaged with the first engaging portion or the second engaging portion, the background and calibration roller is fixed, and the torque limiter does not drive the background and calibration roller, such that the first sleeve presents an idle state.

4. The scanner as claimed in claim 3, wherein the secondary power source comprises an electromagnetic valve, and the third engaging portion is a magnetic member.

5. The scanner as claimed in claim 2, wherein the secondary power source comprises a motor, the stop-driving assembly further comprises a gear connected to the motor, and the third engaging portion comprises a gear rack meshed with the gear.

6. The scanner as claimed in claim 2, wherein the second sleeve and the background and calibration roller are formed integrally.

7. The scanner as claimed in claim 1, wherein the first sleeve comprises an external gear that meshes with a gear of the transmission set.

8. The scanner as claimed in claim 1, wherein the torque limiter comprises a spring or a leaf spring.

9. The scanner as claimed in claim 1, further comprising:
a casing, the background and calibration roller being rotatably disposed in the casing, and the background and calibration roller comprising a stop block, and the casing comprising a first stop wall and a second stop wall located on a rotating path of the stop block.

10. The scanner as claimed in claim 1, wherein the at least one calibration section comprises a white calibration section or a black calibration section or comprises a combination of the white calibration section and the black calibration section.

11. The scanner as claimed in claim 1, wherein the main driving assembly sequentially drives the first sleeve, the torque limiter and the background and calibration roller, and is adapted to make the at least one calibration section of the background and calibration roller facing towards the scanning module.

12. The scanner as claimed in claim 1, wherein the background and calibration roller further comprising a positioning member, the stop-driving assembly is located beside the positioning member of the background and calibration roller and comprises a third engaging portion, the two portions of the background and calibration roller comprising a first surface and a second surface respectively, the third engaging portion is selectively abutted against the first surface or the second surface of the positioning member, so as to make the black background section or the white background section of the background and calibration roller facing towards the scanning module.

13. The scanner as claimed in claim 12, wherein the stop-driving assembly comprises a secondary power source, the third engaging portion is linked to the secondary power source, and the secondary power source is adapted to make the third engaging portion to selectively abutted against the first surface or the second surface of the positioning member, and when the third engaging portion is not abutted against the first surface or the second surface of the positioning member, the main driving assembly drives the background and calibration roller to rotate by means of the first sleeve and the torque limiter, and when the third engaging portion is abutted against the first surface or the second surface of the positioning member, the background and calibration roller is fixed, such that the first sleeve presents an idle state.

14. The scanner as claimed in claim 12, wherein the secondary power source comprises an electromagnetic valve.

* * * * *